(No Model.)
J. KEITH.
EVAPORATOR.
No. 490,967. Patented Jan. 31, 1893.
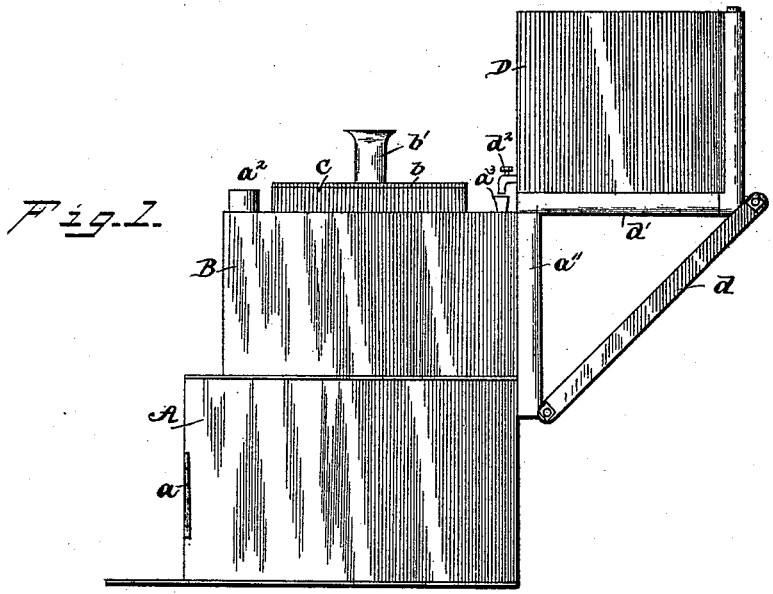
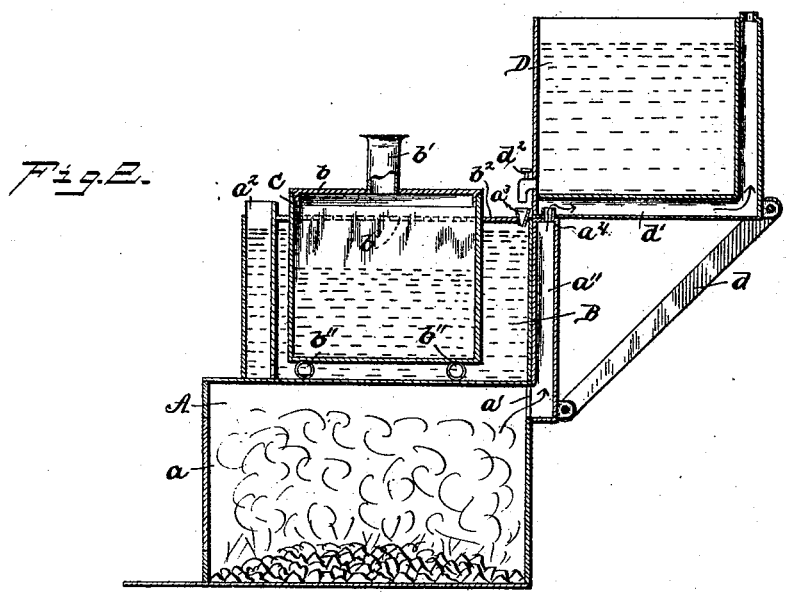
Witnesses
Wm. S. Hodges
Leo C. Marsh
Inventor,
Joseph Keith.
By Patrick O'Farrell
Attorney.

UNITED STATES PATENT OFFICE.

JOSEPH KEITH, OF DUNCAN'S, VIRGINIA.

EVAPORATOR.

SPECIFICATION forming part of Letters Patent No. 490,967, dated January 31, 1893.

Application filed August 31, 1891. Serial No. 404,302. (No model.)

*To all whom it may concern:*

Be it known that I, JOSEPH KEITH, a citizen of the United States of America, residing at Duncan's, in the county of Floyd and State of Virginia, have invented certain new and useful Improvements in Evaporators, of which the following is a specification, reference being had therein to the accompanying drawings.

This invention relates to fruit evaporators, and has for its object the provision of means whereby the process of preserving, evaporating or cooking different fruits is readily accomplished with but a minimum expenditure of time and labor.

The invention comprises a fire-box or heater, a boiler secured on said heater, a hot-water tank for supplying hot water to said boiler and a vessel or receptacle designed to hold the fruit and be placed in said boiler, substantially as hereinafter fully set forth and particularly pointed out in the claims.

In the accompanying drawings:—Figure 1 is a view in side elevation of my improved evaporator. Fig. 2 is a longitudinal sectional view thereof.

Referring to the drawings, A designates a fire-box having a door $a$, and an opening $a'$ in its upper, rear end.

B is a boiler open at its top and placed on fire-box A and is designed to hold the heated water for cooking the fruit. In the front wall of this boiler is a tube $a^2$ which communicates at its bottom with the inside of the boiler. By means thereof the depth of the water in the boiler can be readily ascertained. The rear wall of this boiler is doubled to form a flue $a''$, the lower end of the outer wall being extended to project down over a portion of the fire-box, and the products of combustion are conducted up through said flue, and pass out through a pipe $a^4$ in an opening in the top of the flue. A funnel $a^3$ is extended through the rear flange or overlapping portion of the boiler.

C is the cooking vessel or receptacle which is designed to be placed in boiler B, the same being snugly held between the flanges of the latter. This vessel or receptacle has a lid or cover $b$ provided with a tube or funnel $b'$ at its center for the escape of vapors formed in the cooking process. The vessel C has suitable rests $b''$ for supporting the same and preventing the bottom of the vessel from coming in contact with the bottom of the boiler, said rests consisting of coiled wire secured to the bottom of said vessel. The flanges $b^2$ of boiler B which project inwardly and fit snugly against vessel or receptacle C are provided with notches or recesses $b^3$ to relieve the pressure of steam from the boiler.

D designates a hot-water tank having one end resting on boiler B and supported by braces $d$ attached to fire-box A, and the rear end of said tank. In the underside and also in the rear end of this tank is formed a continuous flue $d'$ which communicates with flue $a'$ on the rear of boiler B, the pipe $a^4$ being extended into an opening in the bottom of said flue $d'$. When required hot water is drawn from this tank and supplied to the boiler through the medium of a faucet $d^2$, located over funnel $a^3$.

In practice, water is supplied to the heating tank and the same is heated by means of the products of combustion passing from the fire-box through flues $a'$ and $d'$. When heated the water is drawn off from the heating tank into boiler B and fresh water is supplied to said tank. The fruit to be cooked is placed in the vessel or receptacle C and the latter is placed in the boiler. As the water evaporates from the boiler a new supply may be added from tank D.

It will be seen from the above that I have produced a simple and efficient device whereby the process of treating fruit is greatly simplified; that the operation can be carried out without the necessity of stirring the fruit and that all danger of burning and scorching the same is avoided. It will be understood, however, that while I have shown and described a fire-box in connection with my apparatus with slight modification the device can be used on an ordinary cooking stove to equal advantage.

I claim as my invention:—

1. The herein-described improved evaporator, comprising the boiler having upper, inwardly bent flanges, a tube extending down into said boiler and communicating with the bottom thereof, and a cooking vessel located in said boiler and secured by said flanges, and having rests projecting from its underside, and a tank located above said boiler and designed to supply the same with hot water as set forth.

2. The herein-described improved evaporator, comprising the fire-box, the boiler fitted thereon having a flue at its rear end leading from said fire-box, a cooking vessel located in said boiler, and a hot-water tank located at a higher level than said boiler and having a flue extending under its bottom and up its rear wall communicating with said flue of the boiler, said tank being designed to supply water to said boiler as set forth.

3. The combination with the fire-box, of the boiler secured thereon having a flue at its rear end leading from said fire-box, and having a funnel or opening in its upper portion, a cooking vessel located in said boiler, and a hot water tank having a flue extending under its bottom and up its rear wall communicating with said flue of the boiler, and provided with a faucet or outlet opening over said funnel or opening in said boiler, substantially as set forth.

In testimony whereof I affix my signature in presence of two witnesses.

JOSEPH KEITH.

Witnesses:
AJ KORLY,
J. L. MEREDITH.